(12) United States Patent
Gonzalez Merino et al.

(10) Patent No.: US 7,445,276 B2
(45) Date of Patent: Nov. 4, 2008

(54) INTERNAL SUNSHADE FOR TRANSPARENT ROOFS OF AUTOMOBILES

(75) Inventors: Ricardo Gonzalez Merino, Burgos (ES); Ricardo Iglesias Sedano, Burgos (ES); Juan Carlos Sadornil Santamaría, Burgos (ES); Cesar Marcos González, Burgos (ES); José Ignacio González Saiz, Burgos (ES); Ricardo Perez Oca, Burgos (ES); Javier Manzanedo Gonzalez, Burgos (ES); Pedro Saiz Ausin, Burgos (ES); Carlos Selgas Caceres, Valladolid (ES)

(73) Assignee: Grupo Antolin-Ingenieria, S.A., Burgos (ES)

( * ) Notice: Subject to any disclaimer, the term of this patent is extended or adjusted under 35 U.S.C. 154(b) by 8 days.

(21) Appl. No.: 10/592,308

(22) PCT Filed: Mar. 8, 2005

(86) PCT No.: PCT/ES2005/070024

§ 371 (c)(1),
(2), (4) Date: Sep. 11, 2006

(87) PCT Pub. No.: WO2006/067253

PCT Pub. Date: Jun. 29, 2006

(65) Prior Publication Data

US 2007/0205636 A1    Sep. 6, 2007

(30) Foreign Application Priority Data

Mar. 10, 2004  (ES)  ................ 200400591

(51) Int. Cl.
*B60J 3/02* (2006.01)
(52) U.S. Cl. .................................... 296/214; 296/97.11
(58) Field of Classification Search ................. 296/214, 296/97.9, 97.11
See application file for complete search history.

(56) References Cited

U.S. PATENT DOCUMENTS

| 4,674,789 A | 6/1987 | Watjer et al. |
| 6,428,088 B1 * | 8/2002 | Castonguay et al. ........ 296/214 |
| 2004/0155489 A1 * | 8/2004 | Kawasaki ................... 296/214 |

FOREIGN PATENT DOCUMENTS

| EP | 332 736 | 9/1989 |
| EP | 1 449 692 | 8/2004 |
| EP | 1 495 889 | 1/2005 |
| JP | 10 211820 | 11/1998 |

OTHER PUBLICATIONS

International Search Report.

* cited by examiner

*Primary Examiner*—Dennis H Pedder
(74) *Attorney, Agent, or Firm*—Collard & Roe, P.C.

(57) ABSTRACT

Internal sunshade for transparent roofs of automobiles consisting of a cover (1) sized to cover internally the transparent segment of the roof, mounted and displaceable between two longitudinal rails (2) that run along the sides of the vehicle's roof. The cover comprises at least one panel (3) that is attached to crossbars (5, 6, 7) provided on their ends with sliders that can be coupled in the rails (2). The anterior crossbar (5) carries folding visors and a central mechanism (10) for controlling the displacement of the cover (1).

23 Claims, 14 Drawing Sheets

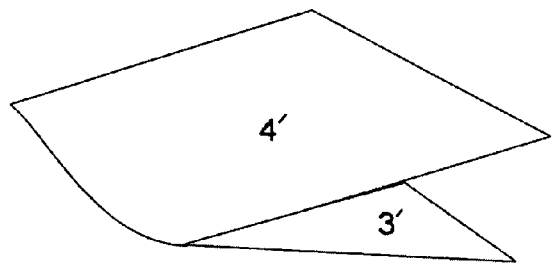
FIG. 2B
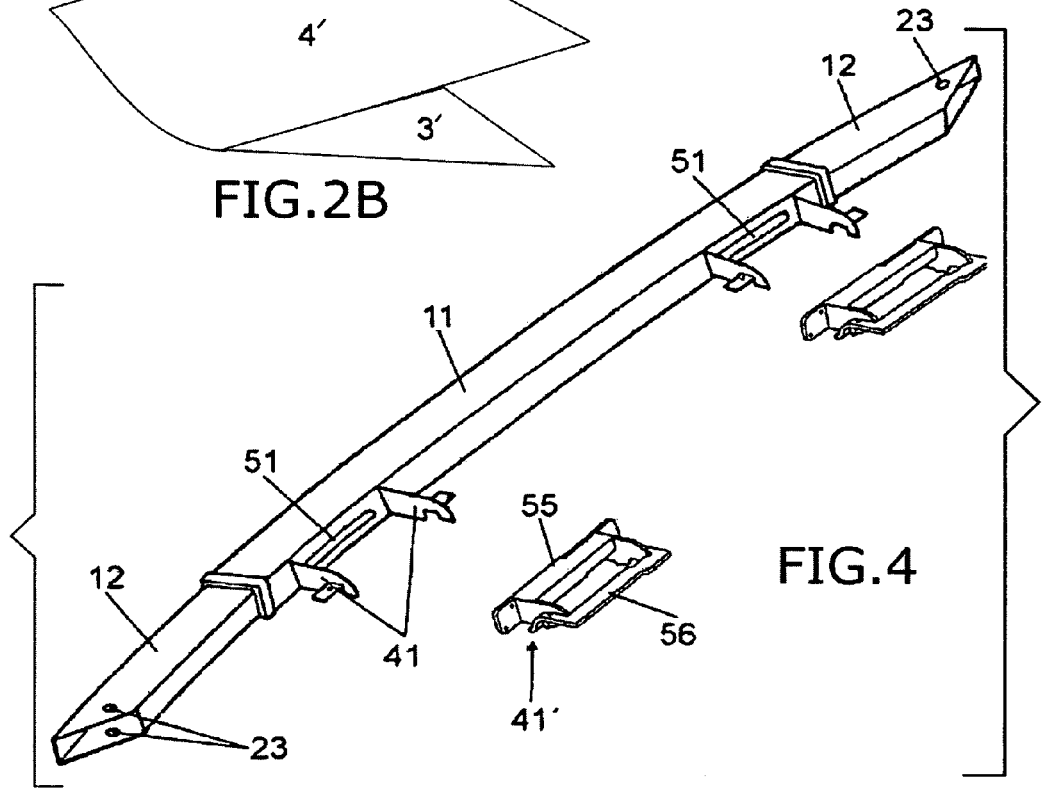
FIG. 4
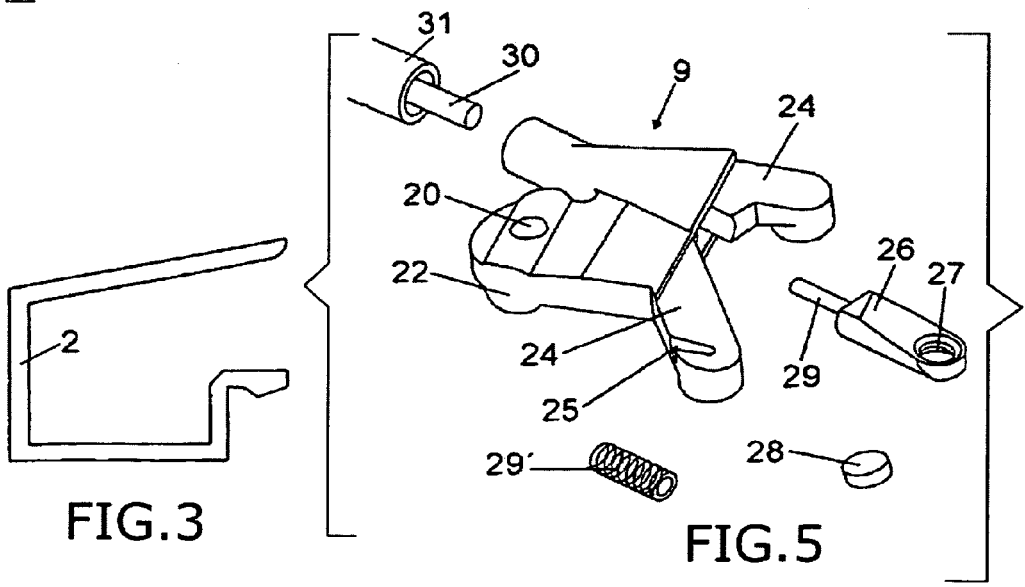
FIG. 3
FIG. 5

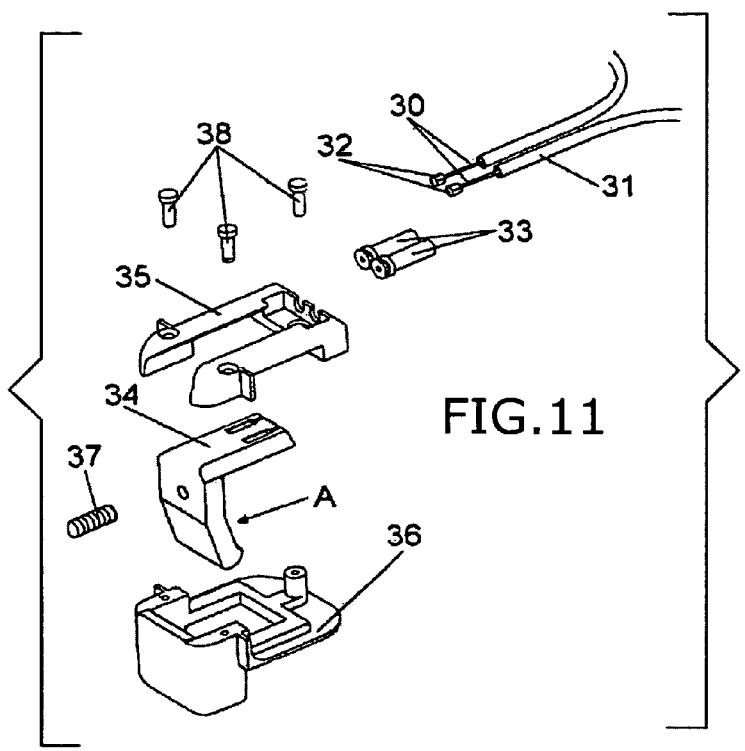
FIG.11
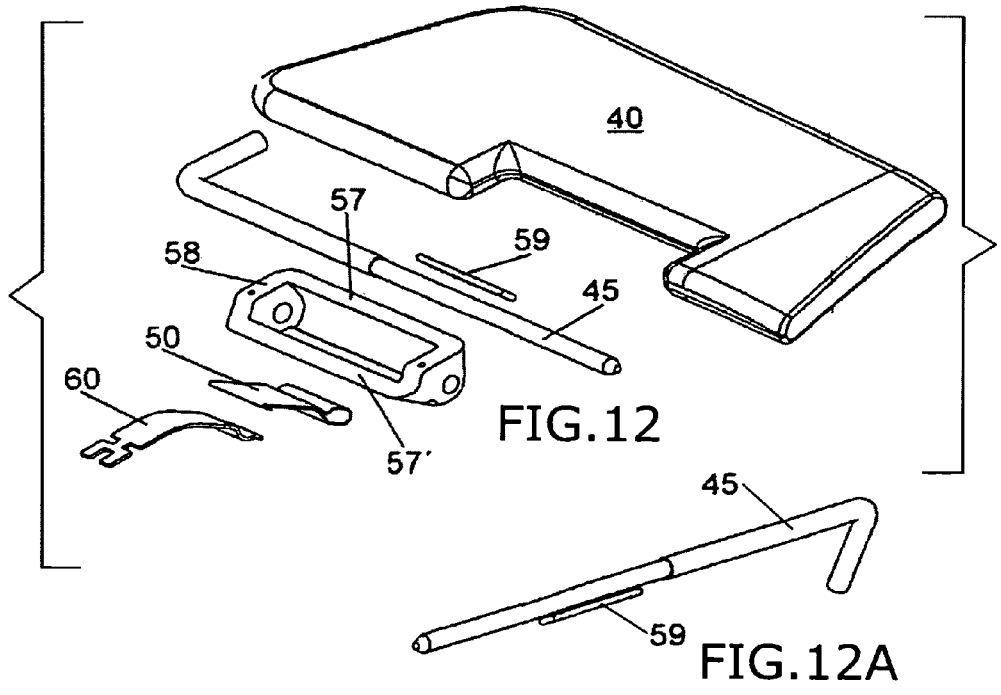
FIG.12
FIG.12A

INTERNAL SUNSHADE FOR TRANSPARENT ROOFS OF AUTOMOBILES

CROSS REFERENCE TO RELATED APPLICATIONS

Applicants claim priority under 35 U.S.C. §119 of Spanish Application No. P200400591 filed Mar. 10, 2004. Applicants also claim priority under 35 U.S.C. §365 of PCT/ES2005/070024 filed Mar. 8, 2005. The international application under PCT Article 21(2) was not published in English.

OBJECT OF THE INVENTION

The present invention relates an internal sunshade for transparent roofs of automobiles, particularly for automobile roofs having an opaque rear segment with internal trimming and a transparent front segment.

BACKGROUND OF THE INVENTION

There exists a currently trend in the automobile sector toward vehicles having large glassed surfaces in the area of the roof.

In this sense, vehicles with a "panoramic roof" are common, in which a large area or surface of the roof, conventionally made of metal plate, is made of glass.

Within this trend there is a new vehicle design known as "panoramic windshield", in which the front windshield pane is longer and extends towards the rear, occupying part of the traditional roof of the vehicle, so that the vehicle front crossbeam must be attached farther behind.

Whichever the constitution or type of the transparent area of the roof, the user requires means for protection against the light that may pass through the transparent area, both from the front and from above.

To protect from the light that may arrive from the front, visors are traditionally used attached to the front crossbeam of traditional roofs.

To protect from the light that may arrive vertically, roofs of the type described above are traditionally provided with a sunshade device that allows to cover or uncover the transparent area of the roof at the user's will.

U.S. Pat. No. 4,674,789 discloses a roof of such type, in which the sunshade device consists of a panel that slides between a retracted position and an extended position towards the front, which provides protection against light incident vertically. The panel can carry visors for protection against light that arrives from the front. This system includes a central console that juts out of the vehicle roof and which may constitute a hazard in case of accident. In addition, the system does not include actuation means that allow selecting and fixing any position of the panel between the extended and retracted positions. In addition, the structure required is relatively bulky and complex.

Document EP 332736 describes a sunshade device constituted by visors that can be stowed between the vehicle roof and its trimming. This system is applicable when the transparent area has relatively small dimensions.

In addition, all of the described systems are conceived to cover a transparent area with a constant width, and thus are not applicable to roofs that widen gradually towards the front on their anterior part and in which the transparent area shares this characteristic.

The object of the present invention is to eliminate the aforementioned drawbacks by a sunshade for vehicle roofs of the type described, which does not include elements that may imply a risk for the occupants and that ensures their integrity and safety, without any accidental displacements of the sunshade device that are not controlled by the user.

Another object of the invention is to provide a sunshade system that can be easily operated with a simple operation mechanism and constitution.

An object of the invention is to provide a sunshade applicable on transparent areas whose width increases gradually towards the front of the vehicle and that adapts to the various dimensions of its roof when it moves from its end retracted and extended positions.

The sunshade of the invention is in addition easy to mount, lightweight and sturdy and may be conceived as a modular assembly attached to the vehicle roof, applicable to panoramic roofs and to roofs with panoramic windshields

DESCRIPTION OF THE INVENTION

The present invention consists of an internal sunshade for transparent roofs of automobiles, which can slide in a longitudinal sense and consists of a cover sized to cover from the inside the anterior transparent segment of the roof, as an extension of the trimming of the rear opaque part of the roof, and two longitudinal rails that run along the sides of the roof between which the cover is mounted and may slide.

Said cover can consist of one or two panels of a flexible material with at least two crossbeams attached to it and provided on their ends with sliders anchored to the longitudinal rails such that they may slide along them.

The panel or panels conforming the cover shall be made of a material sufficiently flexible to conform to the curvature of the roof and sufficiently strong to withstand the fatigue loads during the lifetime of the vehicle. Said panels can be made of a plastic material with a density suitable for complying with the requirements, transformed by thermoforming means. Their flexibility thus gives the panel the capacity to adapt to curvatures normal to the surface, while their strength implies that the panel will not be deformable in directions tangential to said surface, such as would be the case for an elastic net. These nuances must be considered together when interpreting the term "flexible" applied to the panel.

The cover may include two, three or more crossbeams; in every case the anterior crossbeam will be placed near or in coincidence with the front edge of the cover and bear two folding visors and a central mechanism for controlling the displacement of said cover.

The rails on which the cover moves shall consist of as many profiles attached to the sides of the roof and running along its transparent and opaque segments. The cover may slide along these rails and may be locked between either of its end positions, the anterior position closing the transparent segment and the rear position for opening it, or at any intermediate point.

Vehicle roofs generally increase in width at their anterior part, which will be occupied by the transparent area. The roof sunshade device of the invention is conceived to cover entirely the anterior transparent area, adapting to its width. To do so, according to the invention, the rails on which the cover slides diverge at their anterior position and the anterior crossbeam of said cover has telescopic constitution, so that its length can be regulated by a push or pull in an axial direction by the sliders coupled on their ends as said sliders slide along the rails.

According to a preferred embodiment, the anterior crossbeam consists of three segments: a central fixed segment on which the visors are mounted and two end segments axially displaceable between an extracted and a retracted position.

The end segments carry on their free end the corresponding sliders. The visors will be mounted on the central segment by supports allowing them to swivel in certain circumstances about an axis parallel to the crossbeam.

To allow covering the entire transparent area at its anterior area where its width increases gradually, the cover shall include two retractable side panels with an approximately triangular outline, each of which placed on a side of the cover at its anterior part. Each panel is hinged on the rear at a vertex to the adjacent end of the crossbeam nearest the anterior crossbeam, while on the opposite anterior base it is attached to the slider of the end segment adjacent to the anterior crossbeam. With this arrangement the triangular panels, as they turn about the aforementioned vertex, may move between a retracted position in which they are concealed above the lower panel of the cover, and an extracted position in which they are between the cover and the adjacent rail, covering the surface defined between the edges of the cover and the anterior divergent segment of the rails. The extracted position of said triangular panels corresponds to the maximum extraction of the end segments of the anterior crossbeam, while its retracted position corresponds to the innermost or retracted position of the end segments of said anterior crossbeam. These triangular panels shall be flexible, with a behaviour similar to the panel or panels conforming the cover.

In one embodiment of the invention, during the displacement of the sunshade system the visors move laterally in a direction perpendicular to the longitudinal axis of the vehicle by the same amount as the end segments of the anterior crossbeam. For this purpose, the visors are mounted on the central segment of the anterior crossbeam by a grooved part whose transverse walls are crossed by the hinging shaft of the visor. In addition, the visors are related to the adjacent end segment of the anterior crossbeam by a arm that is attached on one end to said segment and on the other to the visor shaft, at the segment of said shaft that runs along the grooved part, this arm acting as a traction means for the visor when the end segment of the crossbeam moves in either sense. The grooved part and the shaft attached to the visors will be provided with locking means to prevent the visors from swivelling until the end segments of the anterior crossbeam reach their fully extracted position. Said locking means will also prevent the retraction of the end segment of the anterior crossbeam from its extracted position when the visors are folded to the usage position. This ensures that the visors cannot be folded to the usage position until the cover reaches its anterior position, while preventing the displacement of said cover to its retraction position until the visors swivel to their inoperative position.

In a second embodiment the visors may swivel but cannot be displaced laterally. In this case, the support about which the visors swivel includes a C-shaped piece that is attached by its central part to the central segment of the anterior crossbeam, for example by means of an anchoring frame, and whose end parts are crossed by the rotation shaft of the visor. In this case the support only includes locking means that prevent the visor from swivelling to its usage position until the end segments of the anterior crossbeam do not reach their position of maximum extraction, yet without the visor undergoing any lateral displacement.

As mentioned above, the sunshade of the invention includes a central control mechanism for displacing the cover. This mechanism includes a handle mounted on the central part of the anterior crossbeam provided with an actuation mechanism to which two traction cables are connected, which run inside fixed sheaths and are attached on their free end to corresponding locking mechanisms mounted on the sliders that are attached to the ends of the anterior crossbeam. Each of these locking mechanisms includes a shoe holder connected to one of the traction cables which can move by means of said cable between a locked position, towards which it is pushed by a spring and in which the shoe leans against the inner surface of the rail in which the shoe is mounted, and a free position in which said shoe holder is retracted by the cable when the button is actuated, so that the shoe no longer rests on the inner surface of the rail.

Another more advanced embodiment of the central control mechanism includes a motorized drive described in greater detail in the description of the preferred embodiments of the invention.

If the cover consists of two panels these may be independent or form a single part that folds transversely.

The sunshade of the invention can be conceived as a modular assembly, in which case it is mounted on the trimming of the opaque rear roof segment so that the trimming sunshade system forms a modular assembly that can be mounted internally on the vehicle roof. For this purpose, the opaque rear segment of the trimming may be provided, from the edge adjacent to the transparent anterior segment, with two end extensions that limit said transparent segment longitudinally. The rails on which the cover can slide will run along and be mounted on the trimming and extensions of said transparent segment.

In any case the cover and rails of the sunshade system may be conceived as a supporting assembly for their direct installation on the inner surface of the vehicle roof, or together with the trimming of the opaque rear segment.

In the sunshade of the invention the cover may consist of one or two panels and include 2, 3 or more crossbeams, and may or may not also bear laterally displaceable visors. In addition, the cover with the crossbeams can form a supporting assembly and can be mounted on the trimming of the opaque rear segment, to form a module with it.

As the assembly of the invention includes a set of rails along its sides it leaves free the central area of the roof, without breaking with the visual surface. In addition, in the roof of the invention the transparent area increases its width on its anterior part, following the shape of the roof, the sunshade including means for adapting to this increase in width by semi-rigid triangular panels that eliminate the possibility of wrinkles.

On another hand, as the panels that form the cover have a semi-rigid structure the exposed inner surface will be lined with the same fabric as the rest of the roof, so that the trimming will be continuous, while giving excellent acoustic properties for eliminating noises.

As described above, the sunshade may be conceived as a supporting module sufficiently rigid to be packed as an independent unit and carried to the assembly line with its trimming. This possibility optimises the mounting operation before the vehicle assembly line, saving intermediate mounting means and rigid packaging in the storage phase immediately prior to its installation.

DESCRIPTION OF THE DRAWING

The characteristics of the invention, as stated in the claims, are described below in greater detail with the aid of the accompanying drawings, which show a non-limiting example of an embodiment of the invention where:

FIG. 2B is a representation of the two panels forming the cover are conformed in a single part folded transversally FIG. 3 is a cross section of one of the guides that form part of the sunshade.

FIG. 4 is a rear perspective view of the anterior crossbeam of the cover, which forms part of the sunshade of FIG. 1, with the means for attaching the visors.

FIG. 5 is an exploded perspective view of the sliders of the anterior crossbeam on the longitudinal rails of the cover.

FIG. 11 is a perspective exploded view of the mechanism that controls the displacement of the cover.

FIG. 12 is a similar view to FIG. 6, showing an alternative embodiment.

FIG. 12A is a perspective view of a visor shaft and flap.

PREFERRED EMBODIMENT OF THE INVENTION

As mentioned above, the vehicle roof of the invention can be panoramic, including a transparent anterior area delimited by an anterior crossbeam and an opaque rear area, or be a panoramic windshield, in which the transparent surface of the windshield extends in part into the roof without discontinuity until it reaches the opaque rear area, which will be provided with an inner trimming. In any case, under the transparent area or segment of the roof is disposed a sunshade that slides in a longitudinal sense. This sunshade is constituted, as shown in FIGS. 1 and 2, by a cover generally referred to by the number (1) and sized to cover internally the transparent area or segment of the roof, as an extension of the trimming of the opaque rear roof segment, and by two longitudinal rails referred to by the number (2) and which run along the two sides of the vehicle roof.

Figure 1:
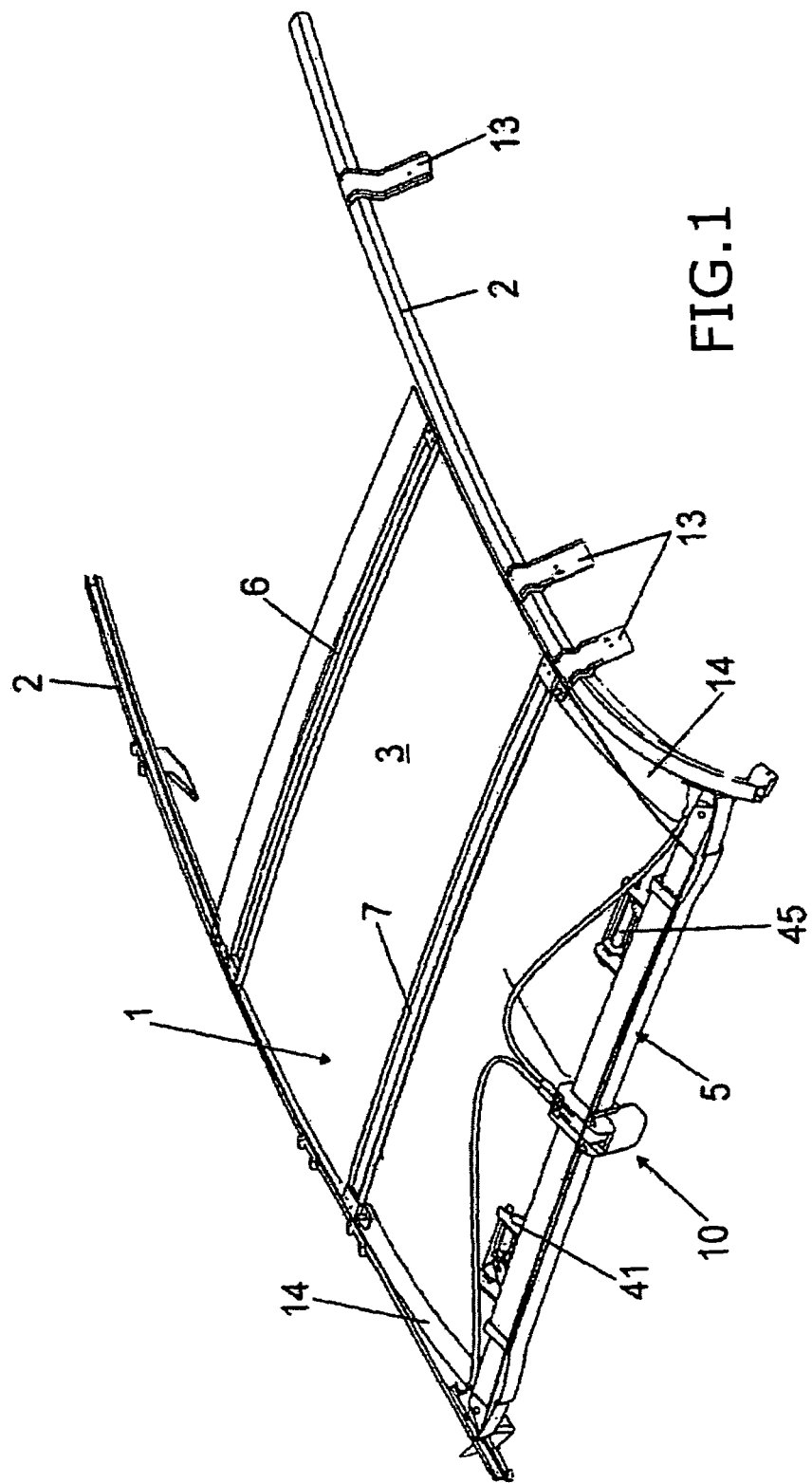
FIG. 1 is a top perspective view of the roof sunshade, constituted according to the invention.

The cover (1) may consists of a single panel (3) as shown in FIG. 1, or by two panels (3, 4) as shown in FIG. 2. Said panels (3, 4) shall be made of a flexible material so that they can be adapted to the shape of the roof, with its same curvature, without any functional or aesthetic deterioration during the product's lifetime. In addition, it must have good acoustic properties and provide an aesthetic function, concealing all of the mechanisms of the system and defining the exposed surface of the roof when placed under it.

The cover (1), constituted by one or two panels, shall have a number of crossbeams attached to the rear side of the panel (3), three in the example shown in the drawings: an anterior crossbeam (5), a rear crossbeam (6) and an intermediate crossbeam (7), although it may include only two crossbeams.

The rear (6) and intermediate (7) crossbeams are provided on their ends with sliders (8) housed inside the rails (2) and able to slide inside the latter. Similarly, the anterior crossbeam (5) is provided at its ends with sliders (9) that are also housed in the rails (2) and which will form part of a central control mechanism (10), which will be explained in greater detail with reference to FIGS. 3 and 11.

The anterior crossbeam (5), as shown in FIGS. 1 and 2, shall be placed in coincidence with or near the front edge of the panel (3), the central control mechanism (10) attached to a centred position of said anterior crossbeam, as represented in FIG. 1.

The cover shown in FIGS. 1 and 2 is specifically conceived to be applied on roofs whose transparent area or segment (61) (FIG. 17B) gradually widens towards the front in their anterior area. To adapt to this increasing width the cover is provided with means for covering the areas or segments by which the transparent area is widened.

For this purpose, according to the invention, the length of the anterior crossbeam (5) can be regulated, as it consists of three segments, a central segment (11) and two end segments (12) telescopically assembled in the central segment (11) by their ends, with interposed means to secure the coupling and facilitate the relative sliding of the three segments. Anchored to the free outer end of the end segment (12) are the sliders (9) that slide along the rails (2).

Figure 2A:
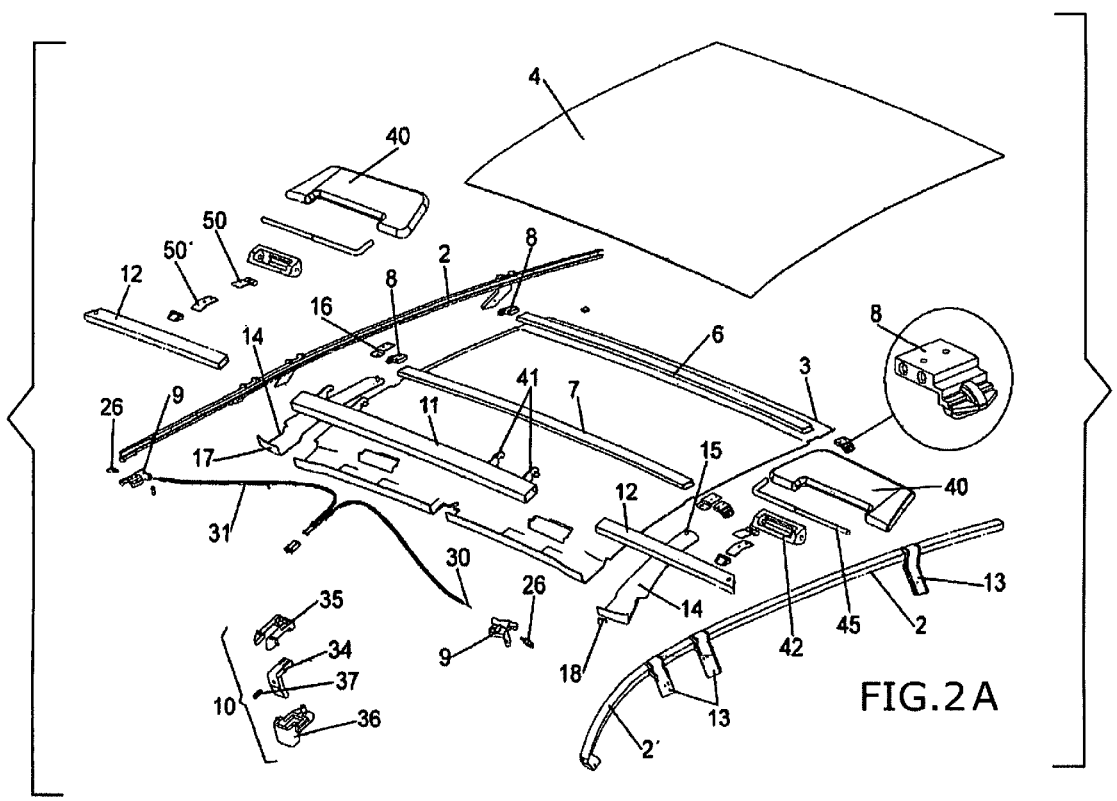
FIG. 2A is a perspective exploded view of the sunshade of FIG. 1.
Figure 6:
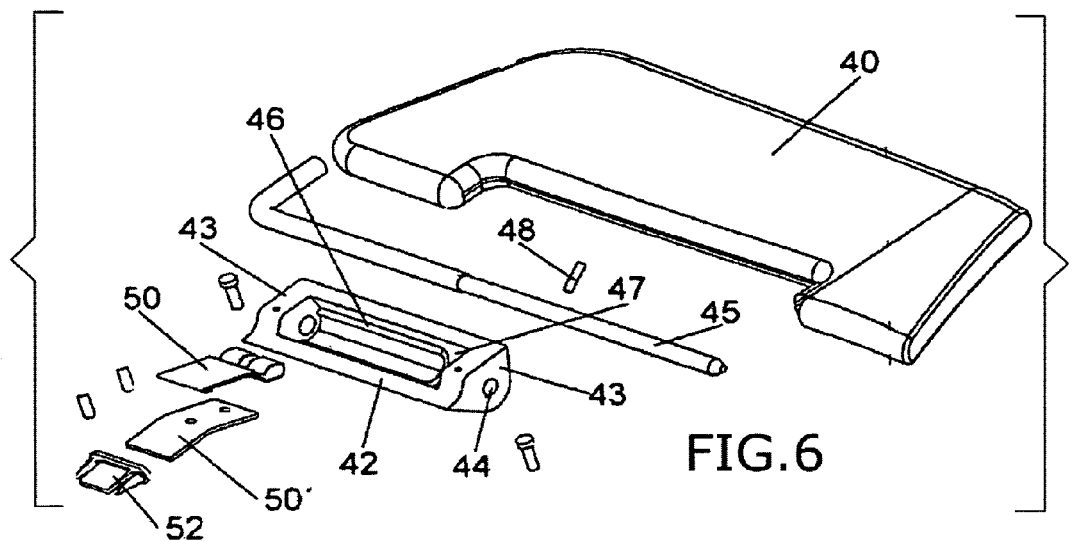
FIG. 6 is an exploded perspective view of one of the visors that form part of the cover of FIGS. 1 and 2.

As seen in FIGS. 1 and 2A, the rails (2) have an anterior segment (2') that is curved downwardly and outward, corresponding to the part of the transparent roof area that gradually widens and begins to form part of the portion corresponding to the windshield. The rails (2) are anchored to the sides of the roof, such as by tabs (13), along its transparent (61) and opaque (62) segments (FIG. 17B), so that the cover (1) can slide along the rails (2) between two end positions: a rear one coinciding with the opaque (62) (FIG. 17B) roof segment where it will be concealed between the trimming and the roof, and an anterior area, shown in FIG. 1, where it is located under the transparent area. As the cover (1) is displaced from the rear to the anterior positions, the sliders (9) of the anterior crossbeam (5) reach and slide along the diverging and dipping segments (2') of the rails, thereby pulling on the end segments

(12) of said crossbeam, increasing its length to adapt to the gradually increasing width of the roof.

Figure 10:
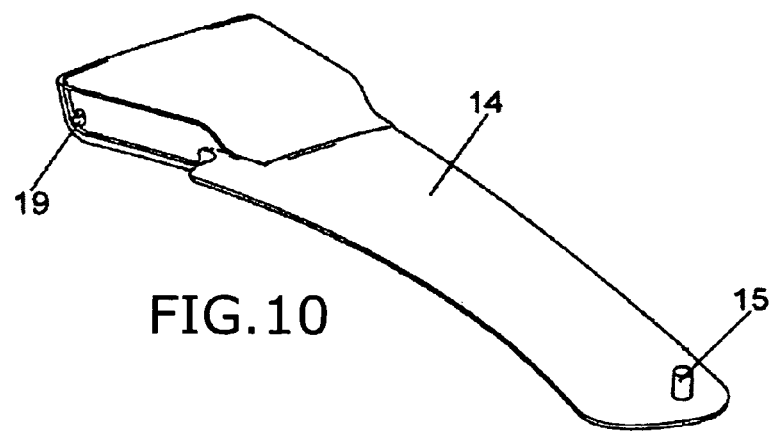
FIG. 10 is a perspective view of one of the triangular panels included in the cover of FIG. 1.

In FIG. 2B it is represented how the two panels (3',4') which form the cover form a single part folded transversally As the panels (3, 4) have a constant width, in order to cover the increased width of the anterior portion of the transparent area (61) (FIG. 17B) of the roof, the cover of the invention includes two retractable panels (14) with an approximately triangular outline, as can be better appreciated in FIG. 10, each of which is placed on one side of the anterior part of the panel (3). The retractable panels (14) are hinged at one of their vertices by a pivot (15) to the intermediate crossbeam (7), for example by a plate (16) attached to the ends of said crossbeam. At the opposite base (17) the panels (14) are related or connected to the slider (9) of the anterior crossbeam end segment (12), for example, by a C-shaped rod (18), one of whose end segments is introduced through the orifice (19), FIG. 10, of the retractable panels (14), while the other end segment is connected to the slider (9).

With this construction, when the cover (1) slides towards the rear position, the panels (14) turn about the pivot (15) and are superposed on the panel (3) behind it. On the contrary, when the cover (1) moves towards the end anterior position the sliders (9) make the panels (14) swivel about the pivot (15) until they are placed as a continuation of the side edges of the panel (3), as shown in FIG. 1, thereby covering the entire transparent area of the roof in a position corresponding to the maximum extraction of the end segments (12) of the anterior crossbeam.

The retractable panels (14) shall be flexible, with a similar performance to the panels (3, 4) that constitute the cover.

As can be seen better in FIG. 5, the sliders (9) of the anterior crossbeam are coupled and attached to the end segments (12) of said crossbeam by a body (22) and area attached by a pin or bolt introduced through orifices (23) opposite an orifice (20) of the body (22). On the opposite side protrude two tabs (24) that constitute the elements for sliding inside the rails (2). One of the tabs (24) is provided with a housing (25) in which the adjacent lateral end of the rod (18) is inserted, FIG. 2. Between the tabs (24) is mounted a shoe carrier (26) provided on one end with a housing (27) for a shoe (28), while on the other end it extends as a stem (29) that is connected to a cable (30) which can slide inside a sheath (31) connected to the central control mechanism (10), as shown in FIG. 11. Mounted on the stem (29) is a spring (29') that constantly pushes the shoe (28) toward the inner surface of the rail. The cables (30) are finished on their end adjacent to the control mechanism (10) at heads (32) which are attached by the sheaths (33) to a button (34) mounted in a sliding position between the parts (35) and (36), which will also embrace the centre segment (11) of the anterior crossbeam (5) for their assembly on it as shown in FIG. 1. The button (34), in the form of an elbowed level that can slide on the part (35), is pushed toward the position nearest the crossbeam (5) by a spring (37); at said position the shoe (28) of the sliders (9) will rest on the inner surface of the profile of the rails (2), thereby locking the position of the cover (1). Pushing the button or lever (34) in the direction of the arrow A will displace it in the sense away from the anterior crossbeam (5). This will pull on the cables (30) and thereby on the shoe carrier (26), so that the shoe (28) will move away from the inner surface of the rails (2) releasing the sliders (9) so that they may move along the rails (2) in either sense, as the central control mechanism (10) is pushed in the same direction. As soon as the button or lever (34) is released the assembly will be locked on the crossbeams (2) to fix any position of the cover (1), whether in its end positions or in any intermediate position. The parts (35) and (36), with the interposed lever (34), are attached by the screws (38).

As may be seen in FIG. 2, the cover of the roof of the invention includes two visors (40) mounted on the central segment (11) of the anterior crossbeam. To this end, as shown in FIG. 4, this segment has two pairs of brackets (41) between which are mounted the visors (40) with a support (42), attached said brackets with screws (70) as represented in FIGS. 6 to 9.

The support (42) has a grooved configuration limited by two transverse walls (43) provided with corresponding opposing orifices (44) though which passes a shaft (45) attached to the visor (40) to act as its swivelling axis. The support (42) is attached to the brackets (41) through the walls (43). The support (42) is internally provided with a longitudinal step (46) and an side segment (47) with a larger cross section in which said step disappears. On its part the shaft (45) has a pin (48) mounted on it which meets the step (46) but can slide along the segment (47) with a larger section.

The visor shaft (45) is also related to the end segment (12) adjacent to the anterior crossbeam by a arm (49) that may consist of an elastic strip (50) mounted on the shaft (45) and an anchoring plate (50') that is attached to the elastic strip (50) by screws (71) and on its free end crosses a longitudinal groove (51) opposite the central segment (11) of the anterior crossbeam, FIG. 4, for connection to the end segment (12) adjacent to said crossbeam. The plate (50') may be attached to the crossbeam segment (12) by a bushing (52).

Figure 7:
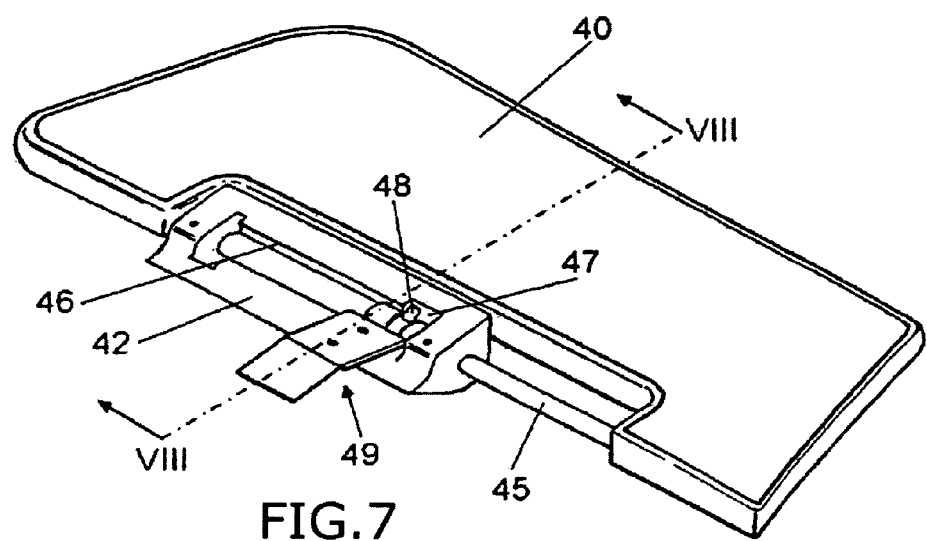
FIG. 7 is a perspective view of the visor of FIG. 6 in its mounted position.
Figure 8:
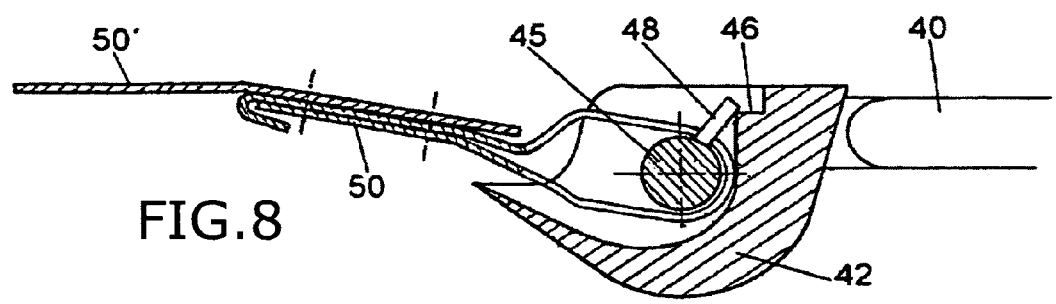
FIG. 8 is a cross section of the visor, along the VIII-VIII line of FIG. 7, with the support placed at the position that prevents said visor from swivelling.
Figure 9:
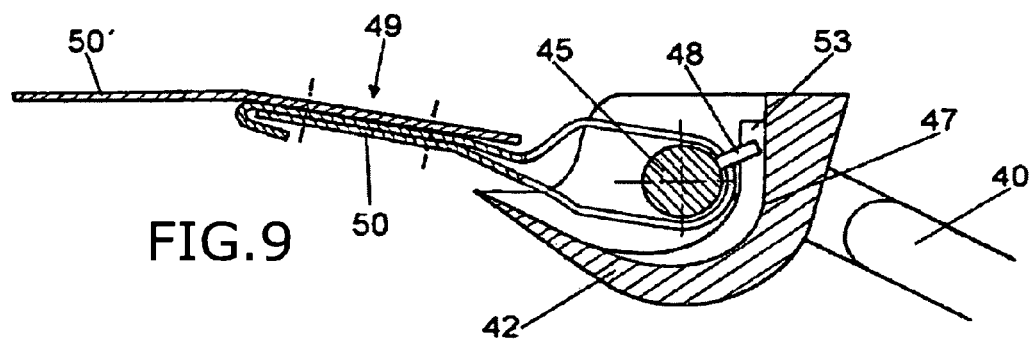
FIG. 9 is a similar cross section to FIG. 8 with the support placed at the position that allows said visor to swivel.

With the above-described construction, when the cover is displaced towards its anterior end position, as the end segments (12) of the anterior crossbeam are displaced to their outer position they carry with them the arms (49) which, through the pressure exerted by the elastic strip (50) on the shaft (45) and its collision with the pin (48), drag with them said shaft (45) and the visors (40) towards the rails (2). When the end position shown in FIG. 7 is reached, the visor (40) can turn with respect to the support (42), as the pin (48) can slide in the wider segment (47) of said support, all of this as shown more clearly in FIG. 9. As the visor is folded toward its usage position, in order to displace the cover towards its rear position the end segments (12) of the anterior crossbeam are prevented from retracting by the pin (48) meeting the wall (53) that internally limits the segment (47) with the large inner section of the support (42), as shown in FIGS. 7 and 9. It will therefore be necessary to swivel the visor (40) towards the position in which it is collected or folded on the cover, so that the visor mounting assembly allows the end segments of the crossbeam to move toward the retracted position, where the pin (48) will rest on the step (46), preventing the visor (40) from swivelling to its usage position.

With the described construction, when the cover (1) is not in its anterior end position the pin (48) of the visors will rest on the step (46) of the support (42), thereby preventing the visor from being folded to its usage position; said operation can only be performed when the cover (1) reaches its end anterior position, when the pin (48) is on the larger section segment (47) of the support (42). At the same time, when the cover is in its anterior end position and the visor (40) is folded in the usage position said cover cannot be moved towards its rear position until the visor (40) is folded on the cover.

Figure 13:
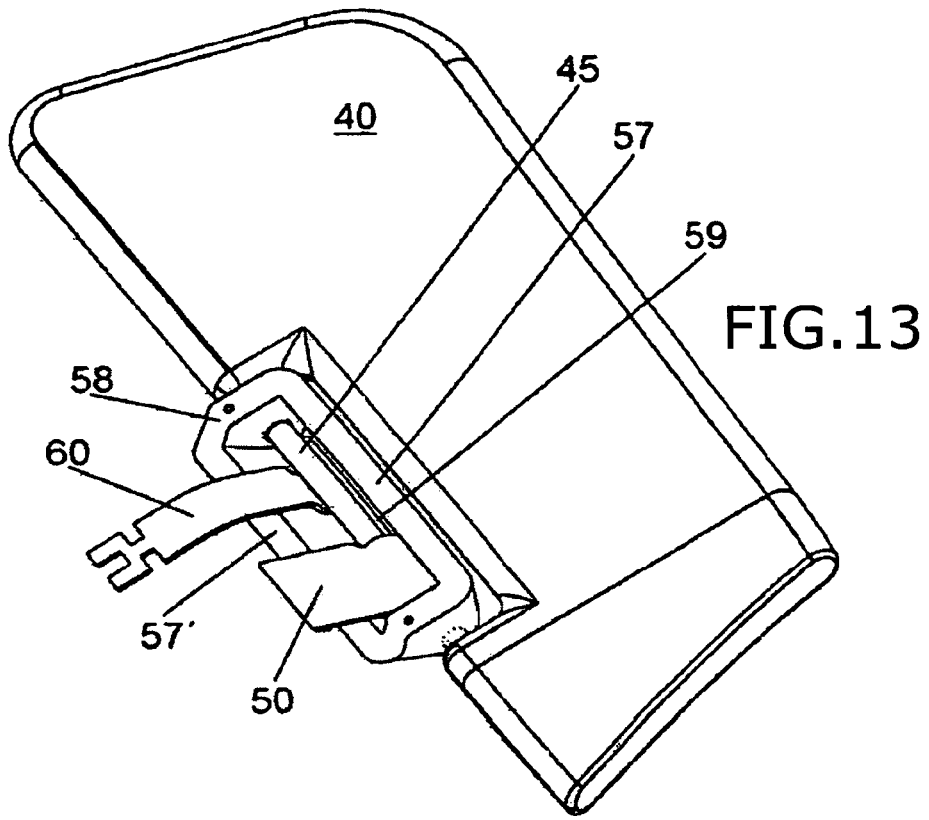
FIG. 13 is a perspective view of the assembly of FIG. 12 in a mounted position.
Figure 14:
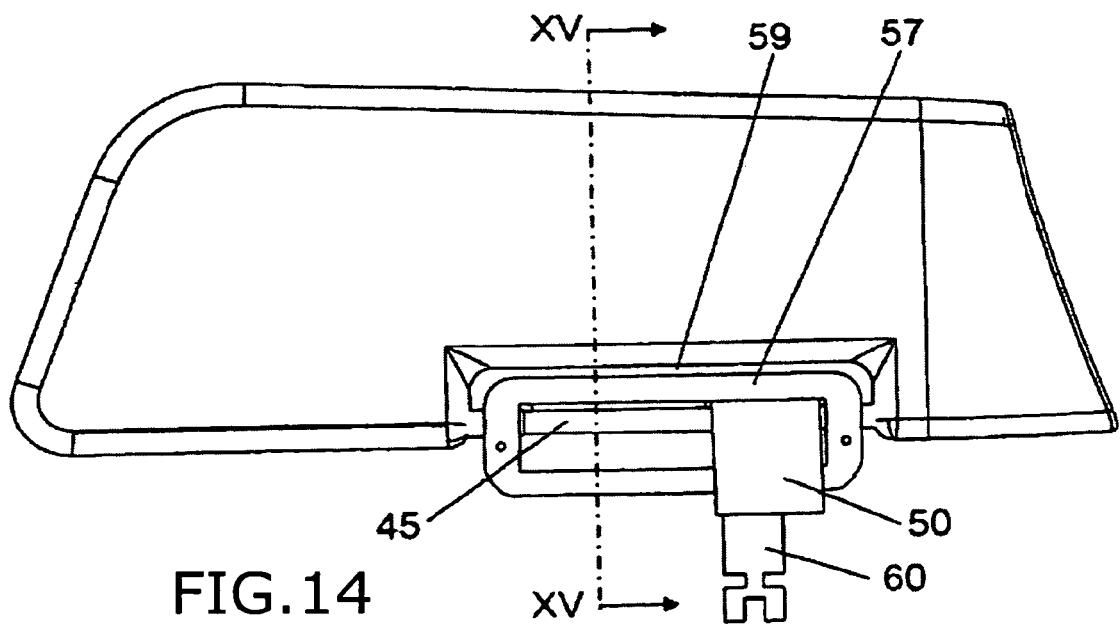
FIG. 14 is a top plan view of the visor assembly of FIG. 13.
Figure 15:
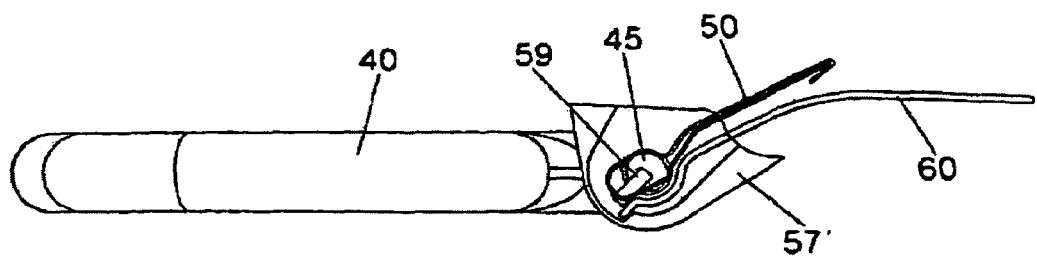
FIG. 15A is a cross section of this visor, along the XV-XV line of figure XIV.
FIG. 15B is detailed view of the elements which are necessary to connect the sunvisor with the crossbeam.
Figure 15B:
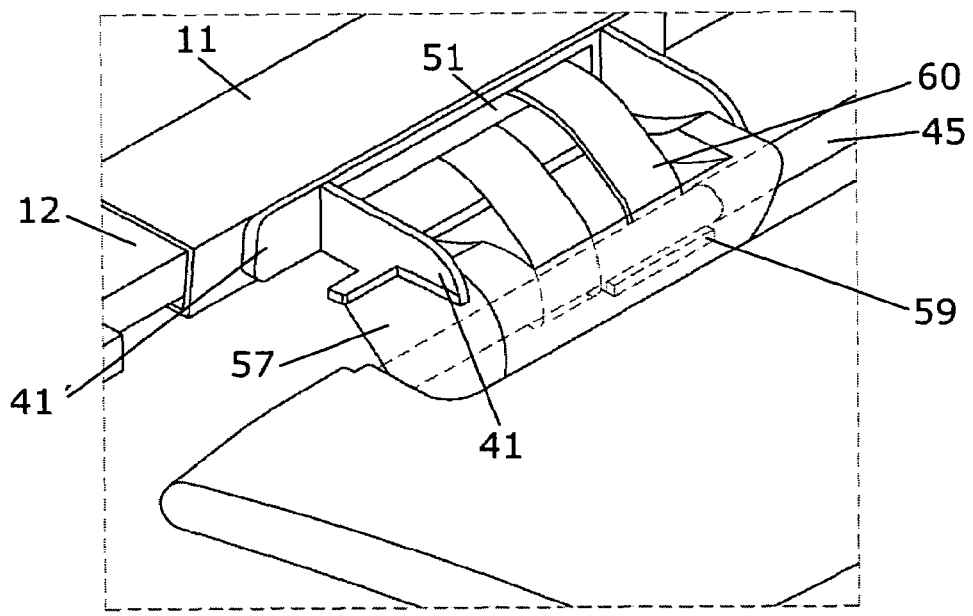

According to an alternative embodiment shown in FIGS. 12 to 15B, the visor (40) cannot be moved sideways, instead having a fixed position. To this end, the brackets (41), FIG. 4) attached to the central segment (11) of the anterior crossbeam can be replaced by a frame (41') that is attached to the segment (11) through one of its greater sides (55), while its opposite side (56) rests on and is attached to a part (57) similar to the part (42) of FIG. 6, with an overall C-shaped structure. The side segments (58) of this C-shaped part are crossed by the visor shaft (45), this shaft being provided at a portion of the segment that crosses the side segments (58) of said support (57) with a radial longitudinal flap (59). Reaching the shaft (45) at the segment that runs between the side segments (58) of the support (57) is an arm (60) that is attached on its opposite end to the outer adjacent segment (12) of the anterior crossbeam by a clip similar to the clip (52) used in the embodiment of FIG. 6. The flap (59) has approximately the same length as the displacement of the end segments of said anterior crossbeam between its retracted and maximum extension positions, so that during this displacement of the end segments the end of the arm (60) is near the flap (59), preventing the rotation of the shaft (45) and with it the visor (40), as shown in FIG. 13. When the end segments (12) of the anterior crossbeam reach their position of maximum extraction the arm (60) is left in the situation shown in FIGS. 14 and 15A and 15B, out of the flap (59), so that the shaft (45) and the visor (40) can turn easily from their folded position on the cover to their usage position. In this position the arm (60) approaches the elastic strip (50) as in the previously described embodiment. The C-shaped part (57) is provided with a longitudinal wall (57'), as an extension of the central segment and between its side segments (58), which will conceal from the occupants' view the various components of the visor support when it folds to its usage position, so that the C-shaped part (57) adopts a similar structure to that of the part (42) of the FIG. 6.

Figure 16:
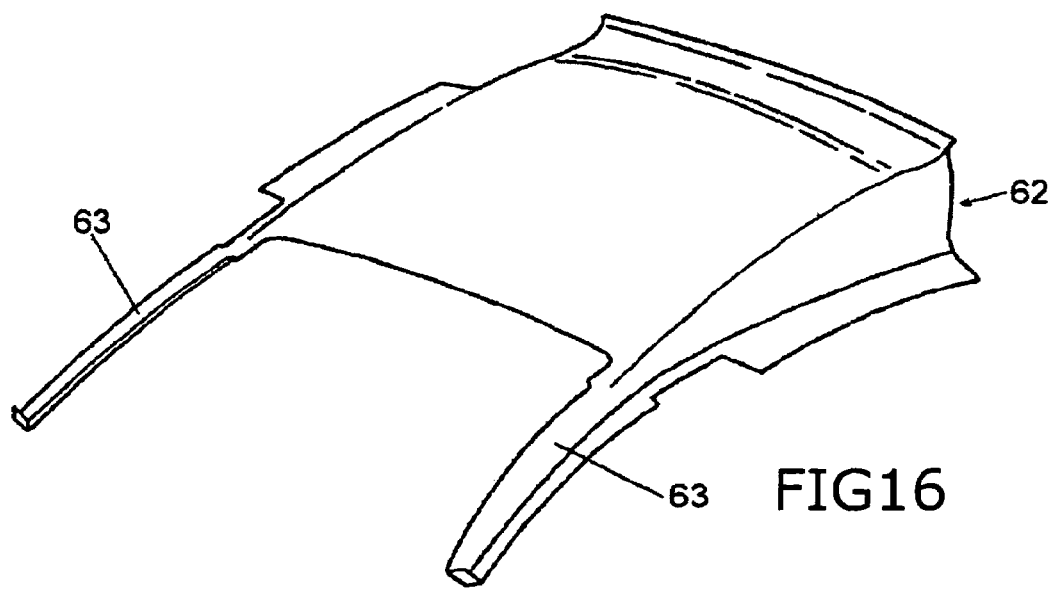
FIG. 16 shows a top perspective view of the trimming of the rear segment of the roof.
Figure 17A:
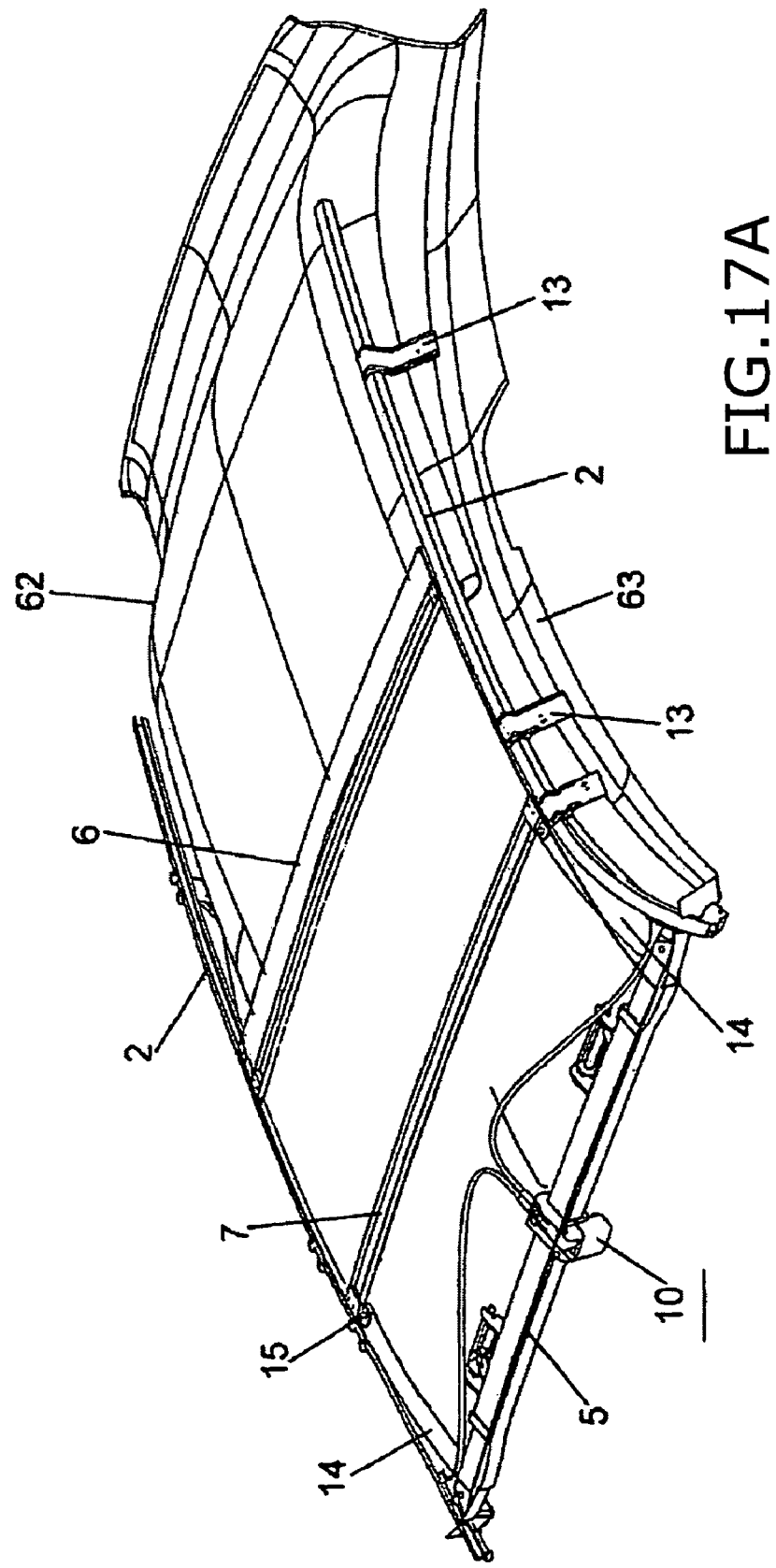
FIG. 17A is a similar perspective view to FIG. 1, showing the sunshade mounted on the trimming of the opaque rear roof segment.
Figure 17B:
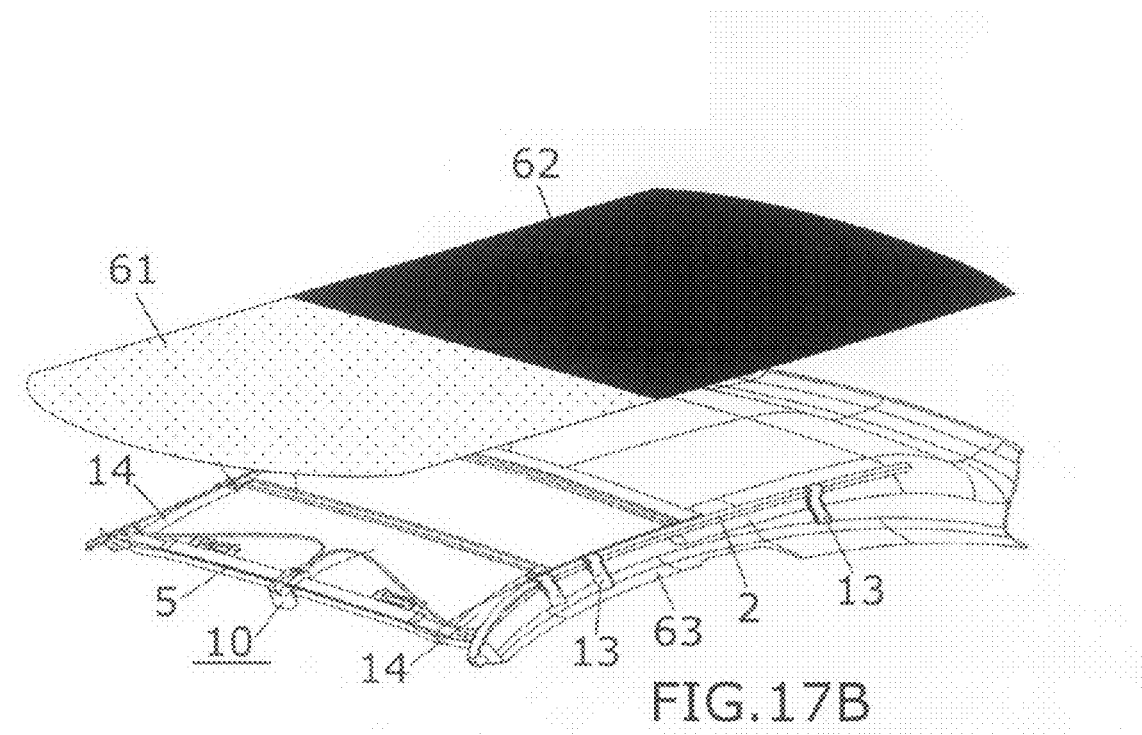
FIG. 17B is shown the roof with the opaque and transparent segments.
Figure 17C:
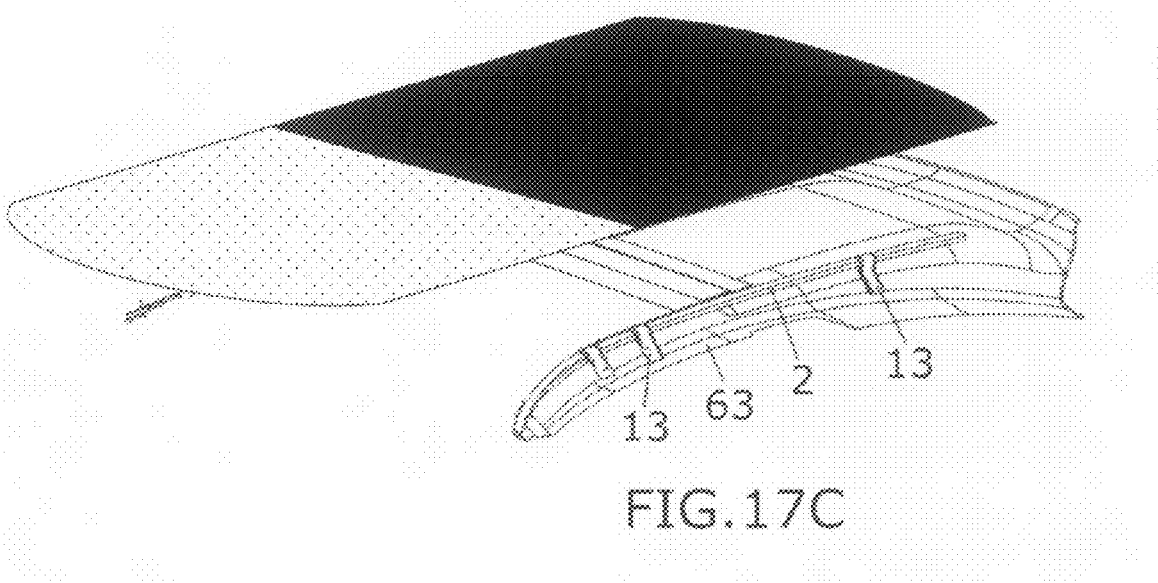
FIG. 17C is shown the moment in which the sunshade is in coincidence with the rear segment.

The cover shown in FIG. 1 can be mounted through the rails (2) directly on the roof of the vehicle or on the trimming (62) that covers the rear segment of the roof, as shown in FIGS. 16 and 17A. For this purpose, the trimming (62) is provided from its anterior edge with two end extensions (63) that will limit longitudinally the transparent segment (61) (FIG. 17B) of the roof. Along the trimming (62) and the extensions (63) are attached the rails (2) of the cover by the tabs (13), as shown in FIG. 17, thereby forming a module that is ready to be internally mounted on the roof of a vehicle.

In the case that the cover includes two panels (3, 4), FIG. 2A, these panels may be independent or obtained from a single part (3', 4') (FIG. 2B) folded transversely.

Regardless of whether the assembly of FIGS. 1 and 2 is mounted on the trimming (62) or it is independent of it, it may constitute a supporting assembly in which the various component elements are previously assembled, the assembly maintaining its configuration during its handling until its final assembly.

FIGS. 18 to 22 show an alternative embodiment for the cover actuation and locking. In this case the central control mechanism has motorized drive means, as described below.

Figure 18:
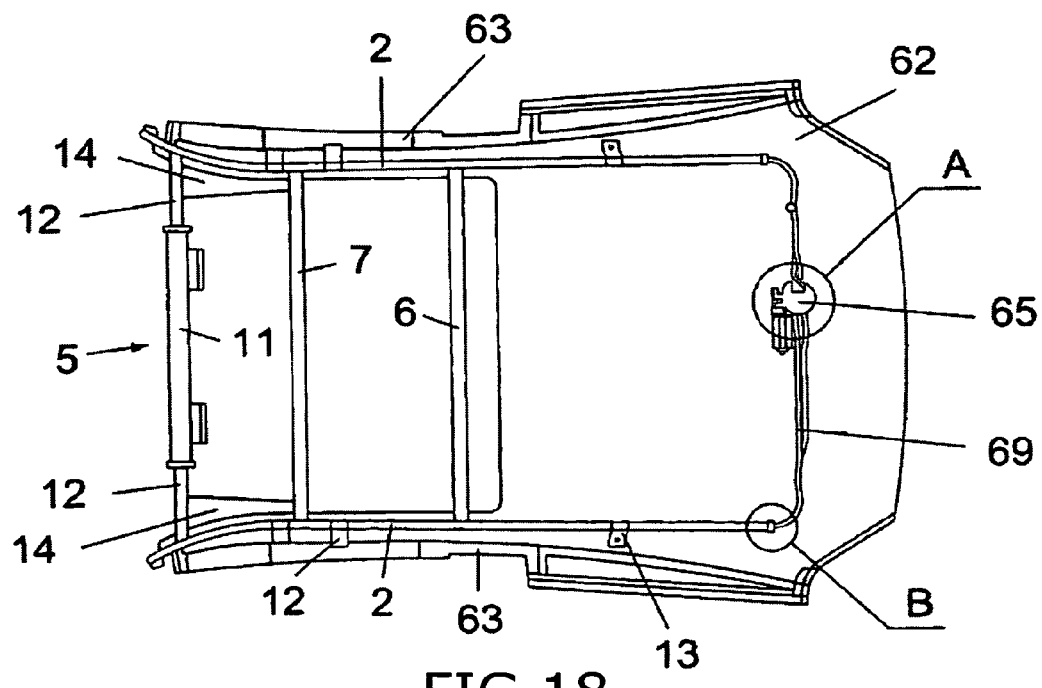
FIG. 18 is a top plan view of the assembly of FIG. 17, without the sunshade panel or panels, showing an alternative embodiment of how to execute the cover actuation and locking.

FIG. 18 shows a top plan view of the assembly or module of FIG. 17, which comprises the trimming (62) covering the opaque rear roof segment, this trimming being provided from its anterior edge with end extensions (63) that will limit longitudinally the transparent area (61) of the roof. In this case, the rails (2) are attached to the roof of the vehicle, for example by tabs (13) as the ones shown. Between the rails (2) run the crossbeams (5, 6 and 7), which are attached to the flexible panel or panels that form the cover.

In the case shown in FIG. 18, as in the previously described example, the crossbeam (5) consists of a central segment (11) and two end segments (12). Between said end segments (12) and the intermediate crossbeam (7) are mounted the retractable panels (14), all of this in a manner identical to that described with reference to FIGS. 1 to 17.

Figure 19:
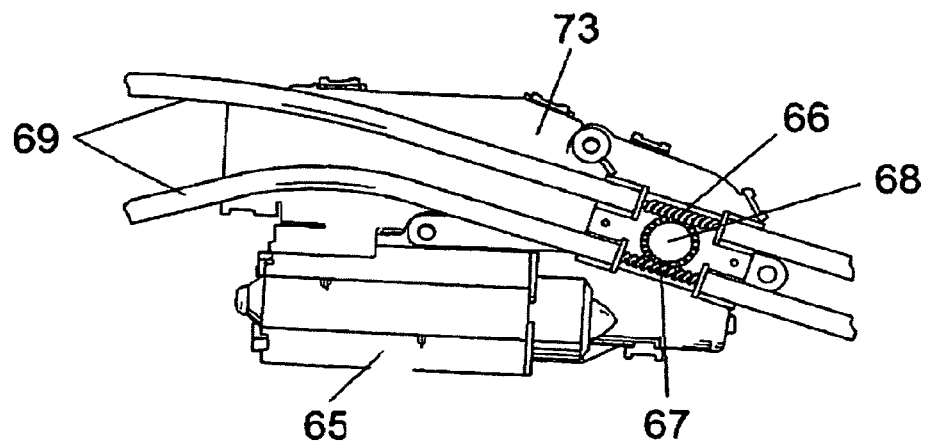
FIG. 19 corresponds to the inset A of FIG. 18 in a larger scale.
Figure 20:
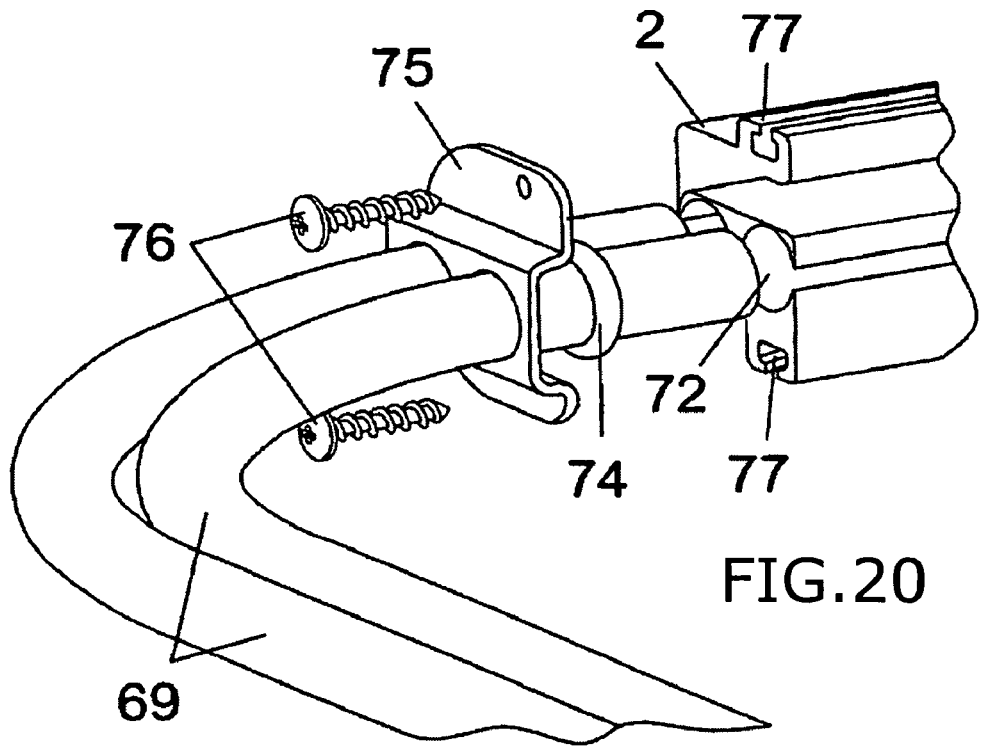
FIG. 20 shows the inset B of FIG. 18 in a perspective view and in a larger scale.
Figure 21:
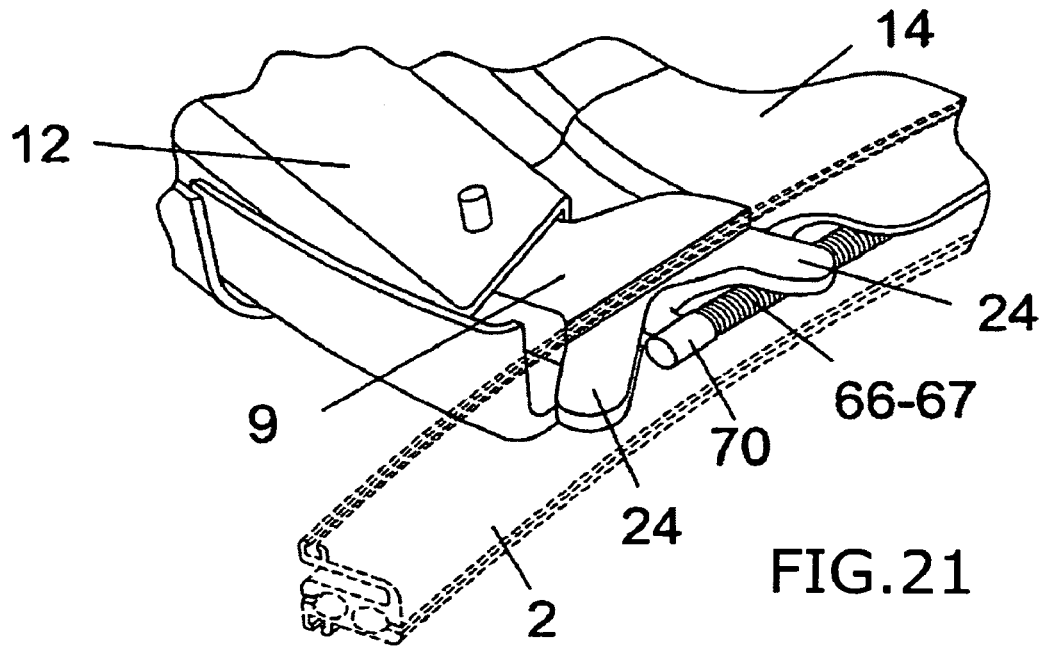
FIG. 21 shows a perspective view of the connection between one of the sliders of the anterior crossbeam and the actuation means cable, as shown in FIG. 18.
Figure 22:
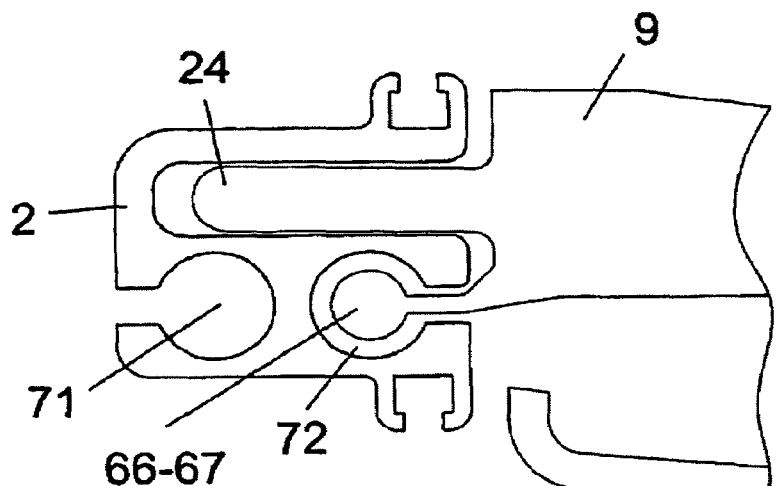
FIG. 22 is a cross section of one of the rails included in the embodiment of FIG. 18.

In the example shown in FIG. 18, the cover actuation and locking is effected with an electric motor (65) which drives a pinion that engages two flexible cables (66, 67) around which a wire is wounded helically that defines a peripheral rib that engages the pinion (68), driven by the motor (65), as can be better appreciated in FIG. 19. The cables (66, 67) run inside tubular sheaths (69). As shown in FIG. 21, each cable (66, 67) is connected on one of its ends to the slider (9) attached to the free end of the end segment (12) of the anterior crossbeam. For this purpose, the slider (9) is provided between the tabs (24) with a head (70) to which the end of the corresponding cabled (66, 67) is attached, such as by overinjection.

In this embodiment the rails (2) consist of a profile with a grooved section, as better seen in FIG. 2, so that inserted in the groove of the profile are the tabs (24) of the slider (8, 9) of the corresponding crossbeam. In the case of the slider (9) corresponding to the end of the anterior crossbeam, it is connected to the cable (66, 67) as described with reference to FIG. 21.

To guide the cables (66, 67) the rail (2) is provided with two longitudinal passages with an approximately circular section, referenced to by the numbers (71) and (72). Through the passage (72) nearest the sunshade cover will run the segment whose end is connected to the slider (9) and which will be henceforth referred to as the anterior or actuation segment, while through the passage (71) will run the segment of the cables that is not connected to the rail, henceforth referred to as the rear segment of the cables, corresponding to the opposite slider.

The cable sheath (69) is attached on one end to the structure (73) that supports the motor (65) and the pinion (68). On its opposite side it is attached to the profile (2), for example by the system represented in FIG. 20. As can be seen, the sheaths (69) end with a peripheral rib (74) that will act as a stop for the penetration or insertion of the sheath (69) in the housings (71, 72) of the profile (2). Behind the rib (74) is provided a plate (75) with through orifices for attachment screws (76) that screw in the grooves (77) of the profile (2).

In this way, the sheaths (69) are prevented from moving and act as guides together with the passages (71, 72) of the profile (2) to guide the displacement of the cables (66, 67) when they are pushed or pulled by the pinion (68), according to its sense of rotation.

This arrangement allows pushing or pulling on the anterior crossbeam (5) in order to displace the cover from its retracted or inoperative position to the anterior or closed position, and vice versa.

With the described actuation system it is not necessary for the slider (9) to have braking means. This action is achieved when the drive motor (65) stops, so that the cables (66, 67) will no longer push or pull the sliders. The position of the anterior crossbeam (5) will be fixed as it is not possible to vary the length of the cables with the motor (65) stopped.

Whichever the execution of the cover actuation and locking system, the visors (40) can be provided with illumination devices. The power can be supplied by a power cable (79) with a variable length, arriving from the vehicle's electrical power source to provide a constant power supply to the illumination elements.

Figure 23:
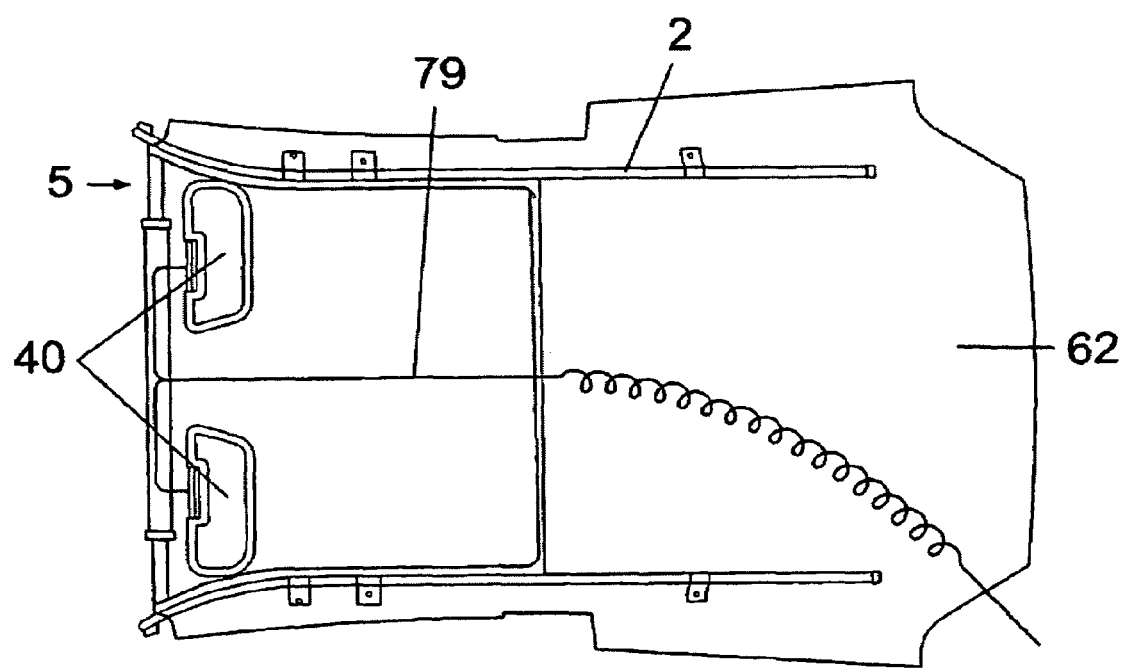
FIG. 23 shows a way to execute the illumination of the visors by a power cable arriving from the electrical power source of the vehicle and connected directly to each visor.

FIG. 23 shows a form of execution of the illumination of the visors (40). In this example the power cable (79) has a wound segment to allow modifying its extended length as the cover advances, and a segment attached to the cover which in its final segment splits in two to provide electricity to each visor (40). In this execution of the illumination of the visors (40), the visors can be illuminated in any position of the cover.

FIG. 23 corresponds to the cover in its extended position, where the cable (79) must attain its maximum length.

Figure 24:
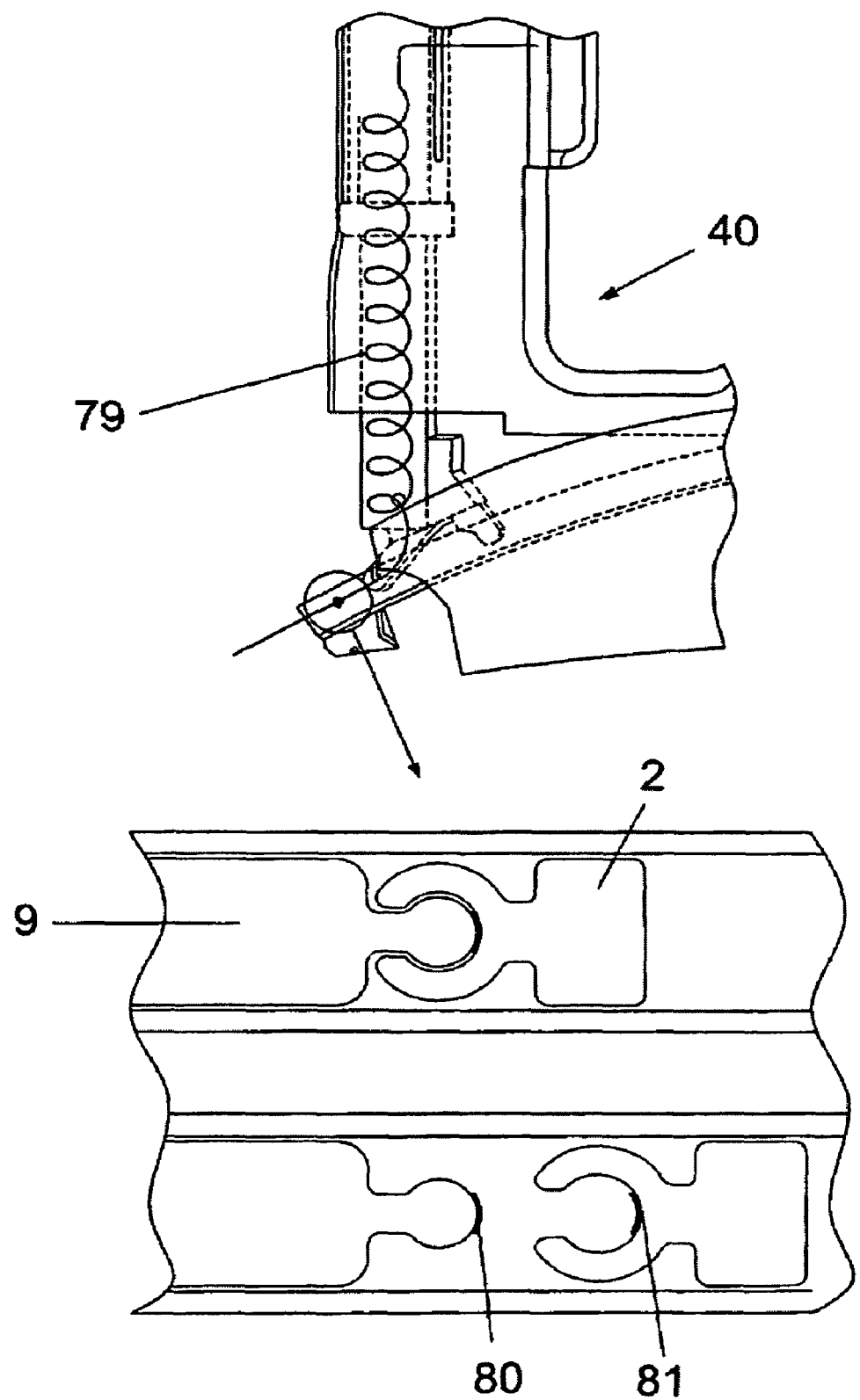
FIG. 24 shows a way to execute the illumination of the visors by the contact established between the slider and the rail.

In another form of execution of the illumination of the visors represented in FIG. 24, the cable (79) can be connected through the slider (9) to an electrical contact formed in the rail (2). In this case, said slider and rail will be provided with electrical contacts (80, 81) which when opposite each other would meet, establishing contact and closing the electrical circuit, from the contact (81) connected to the power source and in the position of full extension of the cover. In this case, therefore, the illumination of the visors (40) is only possible when the cover is fully extended.

The essence of this invention is not affected by variations in the materials, shape, size and arrangement of its component elements, described in a non-limiting manner that should allow its reproduction by an expert

The invention claimed is:

1. A longitudinally sliding internal sunshade disposed under an automobile roof, the automobile roof having a rear opaque segment with an inner trimming and an anterior transparent segment, the internal sunshade comprising:
  a) two longitudinal rails running along two sides of the roof, said at least two longitudinal rails diverging at anterior portions thereof and comprising profiles attached to a side of the roof and running along the rear opaque segment and anterior transparent segment of the roof;
  b) at least two crossbeams, one of said at least two crossbeams comprising an anterior crossbeam having a telescopic constitution;
  c) a plurality of sliders, each of said plurality of sliders disposed at a respective end of a crossbeam of said at least two crossbeams and coupled to a respective longitudinal rail of said two longitudinal rails for traveling along said longitudinal rail, wherein a length of said anterior crossbeam is adjustable by an axial push or pull effected by a pair of sliders of said plurality of sliders disposed at respective ends of said anterior crossbeam as said pair of sliders slide along the respective longitudinal rail;
  d) a cover slidably mounted between said two longitudinal rails and having an anterior edge disposed proximate said anterior crossbeam, said cover being sized to cover internally the anterior transparent section of the roof as an extension of the trimming of the rear opaque segment of the roof, said cover comprising a first panel made of a flexible material attached to said at least two crossbeams and two retractable panels;
  wherein each of said two retractable panels is disposed on a respective side of an anterior part of said cover, has an approximately triangular outline and is sized to cover a surface encompassed between an edge of said cover and an anterior diverging segment of a longitudinal rail of said two longitudinal rails;
  wherein each of said two retractable panels is hinged at a vertex to an adjacent end of a crossbeam of said at least two crossbeams nearest said anterior crossbeam and connected at an opposite base to a slider of said plurality of sliders disposed at an adjacent end of said anterior crossbeam; and
  wherein each of said two retractable panels is adapted to turn about said vertex between a retracted position in which said retractable panel is concealed above said first panel and an extracted position corresponding to a maximum extraction of the end segments of said anterior crossbeam in which said retractable panel is placed between said cover and an adjacent longitudinal rail of said two longitudinal rails;
  e) two folding visors disposed on said anterior crossbeam; and
  f) a central control mechanism disposed on said anterior crossbeam for displacing said cover;
  wherein said cover is displaced and locked along said two longitudinal side rails between two end positions, the two end positions comprising an anterior or closed position wherein said cover covers internally the anterior transparent segment of the roof and a rear or open position wherein said cover is placed in coincidence with the rear opaque segment of the roof with the anterior transparent segment remaining uncovered.

2. The internal sunshade according to claim 1, wherein said first panel of said cover comprises two panels made of a flexible material, between which said at least two crossbeams are placed, said two panels and said at least two crossbeams being joined to form a self-supporting assembly.

3. The internal sunshade according to claim 1, wherein said at least two crossbeams comprise three crossbeams, each of said three crossbeams provided on a respective end with a slider of said plurality of sliders that can be coupled to and slide along said two longitudinal rails.

4. The internal sunshade according to claim 1, wherein said anterior crossbeam comprises three segments, said three segments comprising a fixed central segment on which said visors are mounted and two end segments that can move axially between an extended and a retracted position and which bear on a free end a slider of said plurality of sliders; wherein said visors are mounted in said central segment by corresponding supports that allow said visors to swivel about a shaft parallel to said anterior crossbeam.

5. The internal sunshade according to claim 4, wherein said support on which said visors swivel comprises a grooved piece mounted between two brackets attached to said central segment of said anterior crossbeam, said grooved piece having transverse walls that are crossed perpendicularly by a rotation shaft that runs along said grooved piece and extends beyond said transverse walls at segments by which said visor is attached.

6. The internal sunshade according to claim 5, wherein said visors are also related to an adjacent end segment of said anterior crossbeam by a radial arm that is attached at one end to said segment and at another end is connected to said visor shaft, at said segment of said shaft that runs along said grooved piece, acting as a drive means for said visor in a direction parallel to said crossbeam as it moves said end segment in either sense.

7. The internal sunshade according to claim 5, wherein said grooved piece and said shaft attached to said visors are provided with a locking means for preventing said visors from swivelling until said end segments of said anterior crossbeam reach a position of maximum extraction, said locking means comprising a radial protrusion of said visor shaft that meets said wall of said grooved piece, preventing said visor from turning from its folded position, said grooved piece being internally provided with an end segment with a larger cross section at a side nearer an adjacent rail of said two longitudinal rails, which internally configures a peripheral groove that is opposite said radial protrusion of said shaft when said end segment of said anterior crossbeam reaches the position of maximum extraction, in order to allow said radial protrusion to pass and said shaft and said visor to rotate to a usage position, wherein said radial protrusion of said shaft meets said walls of said peripheral groove to prevent a retraction of said end segment of said anterior crossbeam.

8. The internal sunshade according to claim 7, wherein said radial protrusion of said visor shaft comprises a pin that is diametrically attached to said shaft and extends radially out of said shaft, said pin crossing said radial arm that connects said shaft and said adjacent end segment of said anterior crossbeam.

9. The internal sunshade according to claim 6, wherein said radial arm that connects said shaft of said visors to said adjacent end segment of said anterior crossbeam comprises an elastic strip, an intermediate plate and an attachment clip at said adjacent end segment of said anterior crossbeam, said elastic strip embracing said visor shaft and said intermediate plate being attached on one end to said elastic strip and on an opposite end to said anchoring clip.

10. The internal sunshade according to claim 1, wherein said central control mechanism for displacement of said cover comprises a handle mounted on a central part of said anterior crossbeam, which includes a drive mechanism to which are connected two traction cables that run inside fixed sheaths and are attached by a free end to corresponding locking mechanisms mounted on said sliders attached to the ends of said anterior crossbeam.

11. The internal sunshade according to claim 1, wherein said profiles that form said longitudinal rails have a tubular configuration and, on a wall adjacent to said cover, have a longitudinal groove in which is inserted said slider mounted on an adjacent end of said crossbeams.

12. The internal sunshade according to claim 1, wherein said central control mechanism for said cover comprises two flexible cables with a peripheral helical rib, which run inside said longitudinal rails, and a motor with a drive pinion that engages said cables and is disposed in a rear part of the roof, between the roof and a roof lining; wherein each of said cables is connected by one of its ends to one of said sliders disposed on an end of said anterior crossbeam of said cover.

13. The internal sunshade according to claim 12, wherein said longitudinal rails comprise two grooved profiles, each including on a respective wall two longitudinal passages with an approximately circular cross section through which run an anterior and a posterior end of said cables, wherein at least a profile nearest the sunshade is open along a longitudinal slit through which the corresponding cable is connected to said slider adjacent said anterior crossbeam.

14. The internal sunshade according to claim 1, wherein each of said visors is provided with an illumination device, wherein electrical power for said illumination device is provided by a power cable that arrives from a vehicle's electrical power source and which provides a constant power supply to said illumination device, such that said illumination device is illuminated in any position of said cover.

15. The internal sunshade according to claim 1, wherein each of said visors is provided with an illumination device, wherein electrical power is provided by a power cable, said power cable being connected through a slider of said plurality of sliders to a contact provided on a longitudinal rail of said two longitudinal rails, and wherein both said slider and said rail are provided with corresponding electrical contacts.

16. The internal sunshade according to claim 4, wherein said support by which said visors swivel comprises a C-shaped structure, a frame and a visor shaft; said frame abutting and being attached by a side to said central segment of said anterior crossbeam, while on an opposite side said frame abuts and is attached to said central segment of said C-shaped structure; wherein said visor shaft perpendicularly crosses side segments of said C-shaped structure with freedom to rotate and extends free from said side segments in portions to which said visor is attached.

17. The internal sunshade according to claim 16, wherein said support by which said visors swivel comprises locking means that prevent a swivelling of said visors to a usage position until said end segments of said anterior crossbeam reach said position of maximum extraction, said locking means comprising a flap that juts out radially along a portion of said visor shaft segment that runs between said side segments of said C-shaped structure, and an arm that is attached on one end to an adjacent end segment of said anterior crossbeam, while on an opposite end said arm is directed towards and near a segment of said shaft that runs between said side segments of said C-shaped structure; said flap running along said visor shaft for a length approximately equal to a displacement of said end segments of said anterior crossbeam between said positions of retraction and maximum extension, along which said arm meets said flap to prevent said visor from swivelling until said end segments of said anterior crossbeam reach a position of maximum extraction in which said arm overcomes said flap, allowing said visor to swivel, in which position said arm meets an adjacent transversal edge of said flap to prevent a displacement of said cover to the open position, while said visor remains in a swivelled usage position.

18. The internal sunshade according to claim 17, wherein said arm comprises a plate attached on one end to said central segment and on another end to said visor shaft.

19. The internal sunshade according to claim 18, wherein said visor shaft, in said segment that runs between said side segments of said C-shaped structure and a portion lacking said flap, has an elastic strip mounted on said visor shaft, said elastic strip disposed near said arm when said arm is placed on said portion of said visor shaft, when said end segments of said anterior crossbeam are displaced to a position of maximum extraction.

20. The internal according to claim 2, wherein said two panels forming said cover comprise a single part folded transversally.

21. The internal sunshade according to claim 1, wherein said sunshade is mounted on the trimming of the opaque rear segment of the roof, wherein all parts comprising said sunshade are mounted at a final position on the trimming and are functional, the sunshade and trimming forming a single assembly until a final assembly on the vehicle.

22. The internal sunshade according to claim 21, wherein the trimming of the opaque rear segment of the roof is provided, after an edge adjacent to the anterior transparent segment, with two end extensions that longitudinally limit a transparent area, wherein said two longitudinal rails run along and are attached to the trimming and said two end extensions.

23. The internal sunshade according to claim 1, wherein said cover and said two longitudinal rails comprise a supporting assembly, such that the sunshade is assembled and functions, and maintained in an assembled configuration during handling until a final assembly.

* * * * *